United States Patent [19]

Davis et al.

[11] 4,328,447

[45] May 4, 1982

[54] DC MOTOR SPEED REGULATOR

[75] Inventors: Richard K. Davis; Joe C. Lambert, both of Charlottesville, Va.

[73] Assignee: General Electric Company, Salem, Va.

[21] Appl. No.: 173,300

[22] Filed: Jul. 29, 1980

[51] Int. Cl.³ .............................................. H02P 5/16
[52] U.S. Cl. .................................... 318/331; 318/459
[58] Field of Search ........................ 318/331, 317, 459

[56] References Cited

U.S. PATENT DOCUMENTS

| | | | |
|---|---|---|---|
| 2,799,819 | 7/1957 | Brown | 318/331 |
| 3,671,385 | 6/1972 | McMenamy et al. | 318/332 |
| 3,708,765 | 1/1973 | Salamon et al. | 318/341 |
| 4,119,898 | 10/1978 | Morton et al. | 318/341 |

*Primary Examiner*—David Smith, Jr.

*Attorney, Agent, or Firm*—James H. Beusse; Arnold E. Renner

[57] ABSTRACT

A speed regulating circuit which regulates motor speed without the use of a speed feedback signal by adjusting the magnitude of motor current so as to maintain a predetermined relationship between motor voltage and current. A function generator generates a current reference signal as a function of motor terminal voltage. The relationship between terminal voltage and motor current is established by curve fitting of the motor volt-amp family of curves for constant motor speeds. The current reference signal controls a motor current control circuit, preferably a time ratio or chopper circuit in order to adjust motor current and to regulate motor speed. A closed loop current control loop is associated with the chopper circuit for adjusting motor current to the current reference value.

3 Claims, 4 Drawing Figures

DC MOTOR SPEED REGULATOR

BACKGROUND OF THE INVENTION

The present invention relates to control of direct current (DC) electric motors and, more particularly, to an open-loop speed regulator circuit for a series DC motor.

Performance requirements for electrically powered, low voltage drive systems, particularly the torque-speed requirements, generally dictate the use of DC motors. Although the DC motor may be any of the well-known types such as, for example, series wound, compound wound or separately excited, the series wound motor possesses certain characteristics uniquely suited for use in low voltage battery powered systems. Conventionally, the motor is energized by a chopper circuit which incorporates a controllable switch in series between the motor and a DC power source. By cyclically opening and closing the switch while varying the time ratio of the open time to the closed time of the switch, the magnitude of power supplied to the motor can be regulated. Such chopper circuits are well known in the art.

As will be appreciated, the act of cyclically opening and closing the switch in a chopper circuit serves to periodically connect the motor essentially directly to the DC source, although some inductance is generally in the motor current path. The average voltage on the motor is proportional to the time ratio or duty factor of the chopper circuit.

Although the motor voltage is determined by the chopper duty cycle, the speed of the motor rotor is determined not only by the motor voltage but also by the load applied to the motor. Thus, in order to regulate motor speed, it is necessary to vary the chopper duty cycle as a function of motor load. The prior art has typically utilized a tachometer to monitor motor speed and to provide a control signal to adjust chopper duty cycle for regulating motor speed. However, tachometer circuits are relatively expensive to implement.

SUMMARY OF THE INVENTION

It is, therefore, an object of the present invention to provide an improved control system for a DC motor.

It is a further object of the present invention to provide a control system for a DC motor which senses motor terminal voltage and current and adjusts chopper duty cycle to regulate motor speed.

In the control of speed of a series DC motor, average applied motor voltage and motor current are sensed. A circuit adjusts the duty cycle of a chopper-type control so as to apply a predetermined voltage to the motor at any given current level, this voltage being a nonlinear function of motor current and desired motor speed. For a given motor speed, a known motor voltage is applied at each sensed motor current. In a preferred embodiment, the sensed magnitude of motor voltage is applied to a function generator which derives a current command signal satisfying the predetermined non-linear relationship. The current command signal adjusts the chopper duty cycle to attain the desired motor current thus regulating motor speed.

BRIEF DESCRIPTION OF DRAWING

While the specification concludes with claims particularly pointing out and distinctly claiming the subject matter which is regarded as the invention, it is believed that the invention will be better understood from the following description taken in conjunction with the accompanying drawing in which:

DETAILED DESCRIPTION

Figure 1:
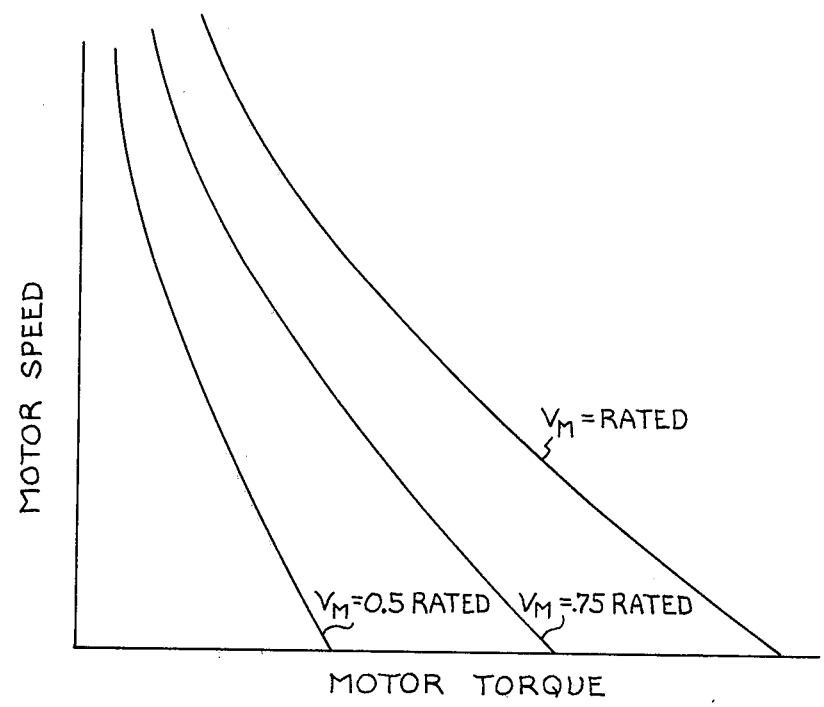
FIG. 1 illustrates a typical family of torque-speed characteristic curves for a series wound DC electric motor.

Referring now to FIG. 1, there is shown a family of typical torque-speed curves for a series wound DC electric motor. Each curve in the family of curves illustrates a decreasing motor rotor speed for an increase in motor load or torque for constant applied motor voltage. The curve labeled $V_M$=Rated represents the torque-speed curve for the particular motor when operated at an applied voltage $V_M$ which will produce rated power output from the motor. The succeeding curves, labeled $V_M$=0.75 Rated and $V_M$=0.5 Rated represent the torque-speed curves for operation of the motor at 0.75 and 0.5, respectively, of the rated voltage. The curves illustrated in FIG. 1 are normally supplied by the motor manufacturer and clearly show that motor speed decreases as load increases even though motor applied voltage remains constant. As a corollary to these curves, it is well known that as motor speed increases with decreasing load for a constant $V_M$, the motor counter electromotive force (CEMF) increases so that motor current decreases. Clearly, regulating applied motor voltage at a constant magnitude will not regulate motor speed where the motor load varies.

Figure 2:
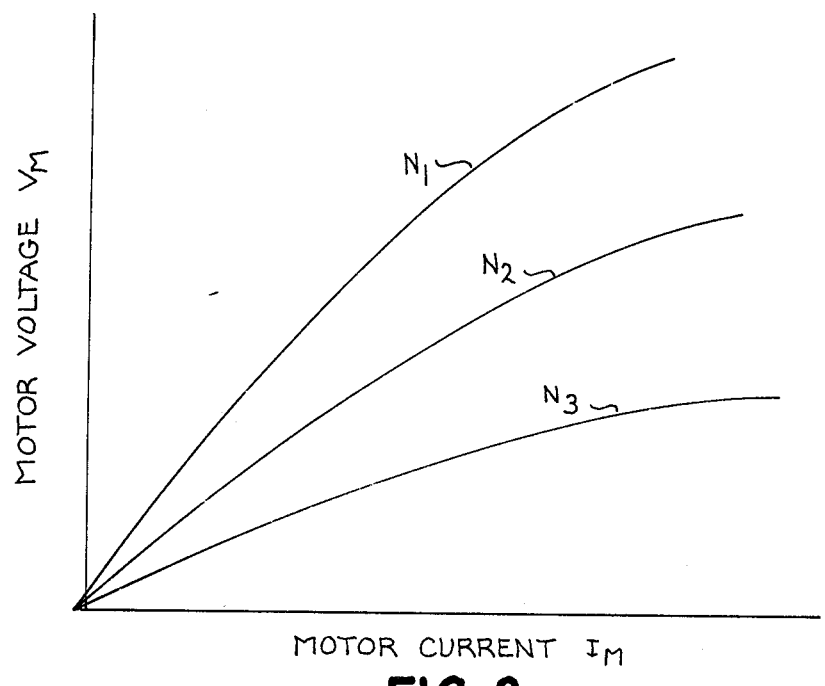
FIG. 2 illustrates a typical family of constant speed curves for a series wound DC electric motor as a function of applied motor voltage and motor current.

Referring to FIG. 2, there is shown a family of constant speed curves for a DC series wound motor as a function of applied motor voltage, i.e., motor terminal voltage, and motor current. Within the operating range of the motor any desired speed can be maintained by regulating the value of motor voltage at a given motor current. It will be apparent from the curves such as, for example, the curve for speed $N_1$, that the ratio between motor voltage and motor current is not a linear function. However, each of the curves for a particular motor have substantially the same relationship, i.e., an equation defining one of the family of curves will vary from the equation for any one of the other curves by only the value of a constant multiplier. Although it is obvious that the curves are in the form of a polynomial, i.e., $I = K_0 + K_1 V_M + K_2 V_M^2 + K_3 V_M^3 \ldots + K_N V_M^N$, experimentation and curve fitting having shown that the curves closely approximate a relationship defined by $I = K_1 V_M + K_2 V_M^4$, wherein, I is average motor current and $V_M$ is the average magnitude of applied motor voltage. The values of the constants $K_1$ and $K_2$ can be determined by solving this latter equation at two points on the constant speed curve illustrated in FIG. 2.

The characteristic curves of motor current and voltage for constant speed may be determined experimentally for a given motor, or may be plotted from manufacturer's data of speed-torque and speed-current relationships.

Figure 3:
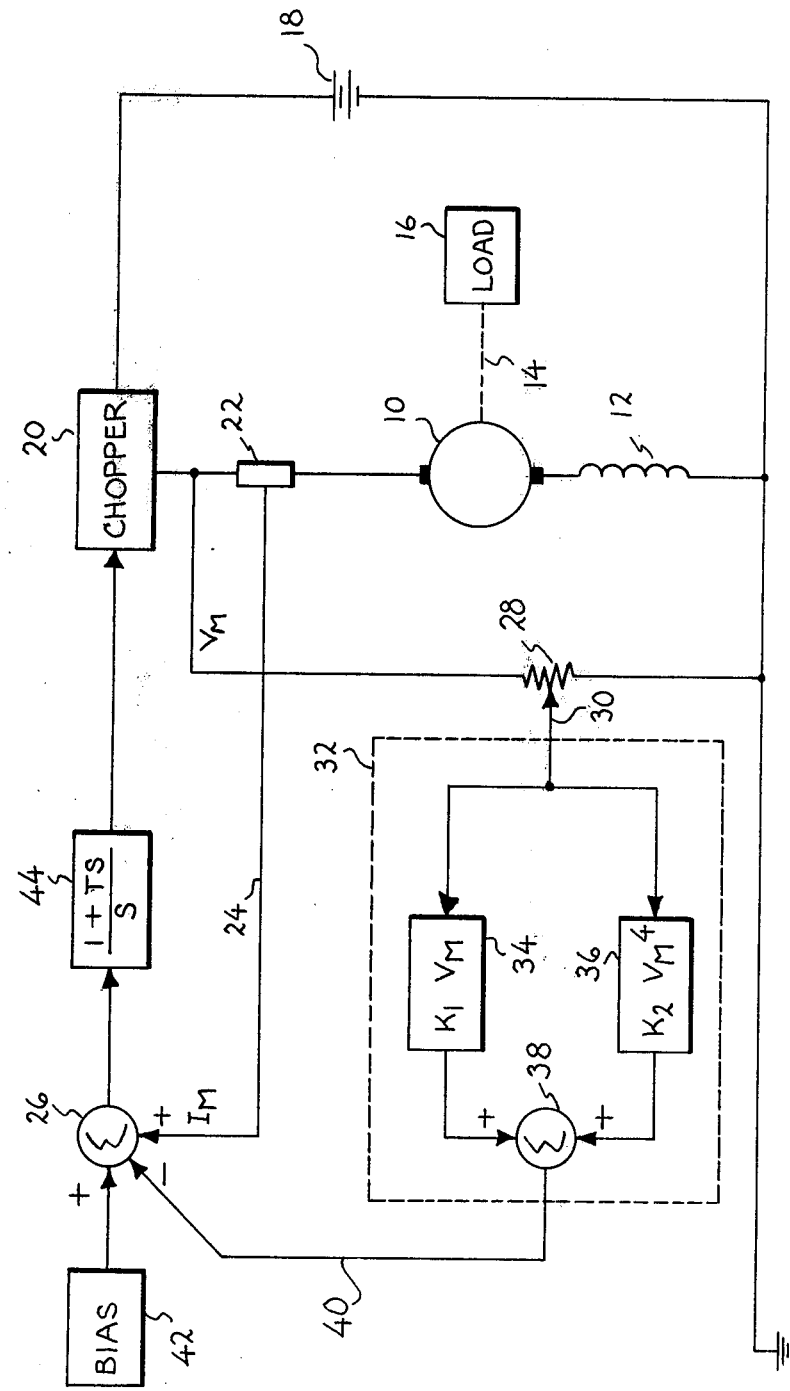
FIG. 3 is a block diagram of a preferred embodiment of the present invention for regulating motor speed; and, FIG. 4 is a more detailed drawing of the circuit of FIG. 3.

Referring now to FIG. 3, there is shown a block diagram of the preferred form of the present invention for regulating the rotor speed of a series wound DC motor. The DC motor is shown as having an armature 10 serially connected to the field winding 12. The armature 10 is mechanically connected as indicated by the dotted line 14 to drive a load 16. The motor armature and field are supplied with power from a battery 18 by means of a chopper circuit 20. A detailed description of chopper circuits made be had by reference to the *SCR Manual*, 5th Edition, published in 1972 by the General Electric Company, Semiconductor Products Department, Syracuse, N.Y. The chopper circuit 20 controls the power applied to the motor by varying its duty cycle or by time ratio control of the voltage applied through the chopper to the motor. In order to control the power applied to the motor, the present invention senses both the current through the motor and the voltage applied thereto. The current is sensed by a current shunt 22 of a type well known in the art. The current shunt 22 typically comprises a resistive shunt and a current signal is developed as a function of the voltage developed across the resistor. As indicated schematically in FIG. 1, a signal from the current shunt 22 is conducted via a line 24 to a summing junction 26. The conversion of the voltage across shunt 22 into a current signal is well known in the art and apparatus for so doing has not been illustrated.

In order to sense the voltage across the series combination of armature 10 and field winding 12, a tapped resistance or voltage divider illustrated herein as a potentiometer 28 is connected in parallel with the armature 10 and field winding 12. The potentiometer 28 provides an output signal from its movable tap 30 which is repesentative of the voltage developed across the motor. The voltage signal on tap 30 is applied to a function generator 32 which in the preferred embodiment implements the relationship $I_M = K_1 V_M + K_2 V_M^4$. In the relationship defined above, $V_M$ represents the voltage applied to the motor. The constants $K_1$ and $K_2$ as previously explained are determined from the motor characteristic curves and are constant values which are electrical characteristics of the motor type.

It can be seen that the function generator 32 has two separate internal blocks one of which computes the value of $K_1 V_M$ and the other which computes the value of $K_2 V_M^4$. Since the actual signals developed by the function generator 32 are proportional to the actual values, the block 34 may comprise simply a resistor and potentiometer for effecting the multiplication function. The block 36 incorporates active circuitry to effect the quartic function. The output signals developed by both the block 34 and block 36 are applied to a summing junction 38 which sums the two signals to produce an output signal representing a current command signal. The current command signal is conducted via line 40 to a second input terminal of the summing junction 26.

A third input terminal of summing junction 26 is connected to receive a small bias signal from a bias circuit 42 which may be, for example, merely a voltage divider circuit. Bias signal permits the control system to begin initial operation. As will be apparent, at initial start up the voltage and current signals are each zero so that a small current is necessary in order to initially provide the feedback signals for the control system and to provide initial excitation for the motor.

The summed output signal developed by the summing junction 26 is coupled to an input terminal of a gain compensation circuit 44 having a characteristic of (1+TS/S), i.e., the network has a characteristic of an integrator with a single zero at the frequency of 1/T so that it has a high gain at very low frequencies and a control gain at high frequencies. The output signal developed by the gain compensation network 44 is applied as the control command signal to the chopper circuit 20.

In the operation of the circuit of FIG. 3, a contactor (not shown) located between the battery and the chopper circuit 20 is closed to allow power to be applied to the motor. Prior to the connection of the battery across the motor and chopper 20, the bias circuit 42 was supplied with power and attempted to cause the chopper circuit to turn on sufficiently to energize the motor to the value established by the potentiometer 28. However, because there was no battery voltage available and therefore there was no feedback signals, the output signal of the gain compensation network 44 integrated to a high value and attempted to turn the chopper full on. As soon as battery power becomes available, the feedback signals force the output signal from the network 44 to reduce in value to a level determined by the setting of the potentiometer 28. In this manner, the control system regulates the speed of the rotor or armature 10 to the desired value. Thus, speed regulation is achieved by measuring motor current and applied motor voltage without the necessity of providing a tachometer for speed feedback.

Figure 4:
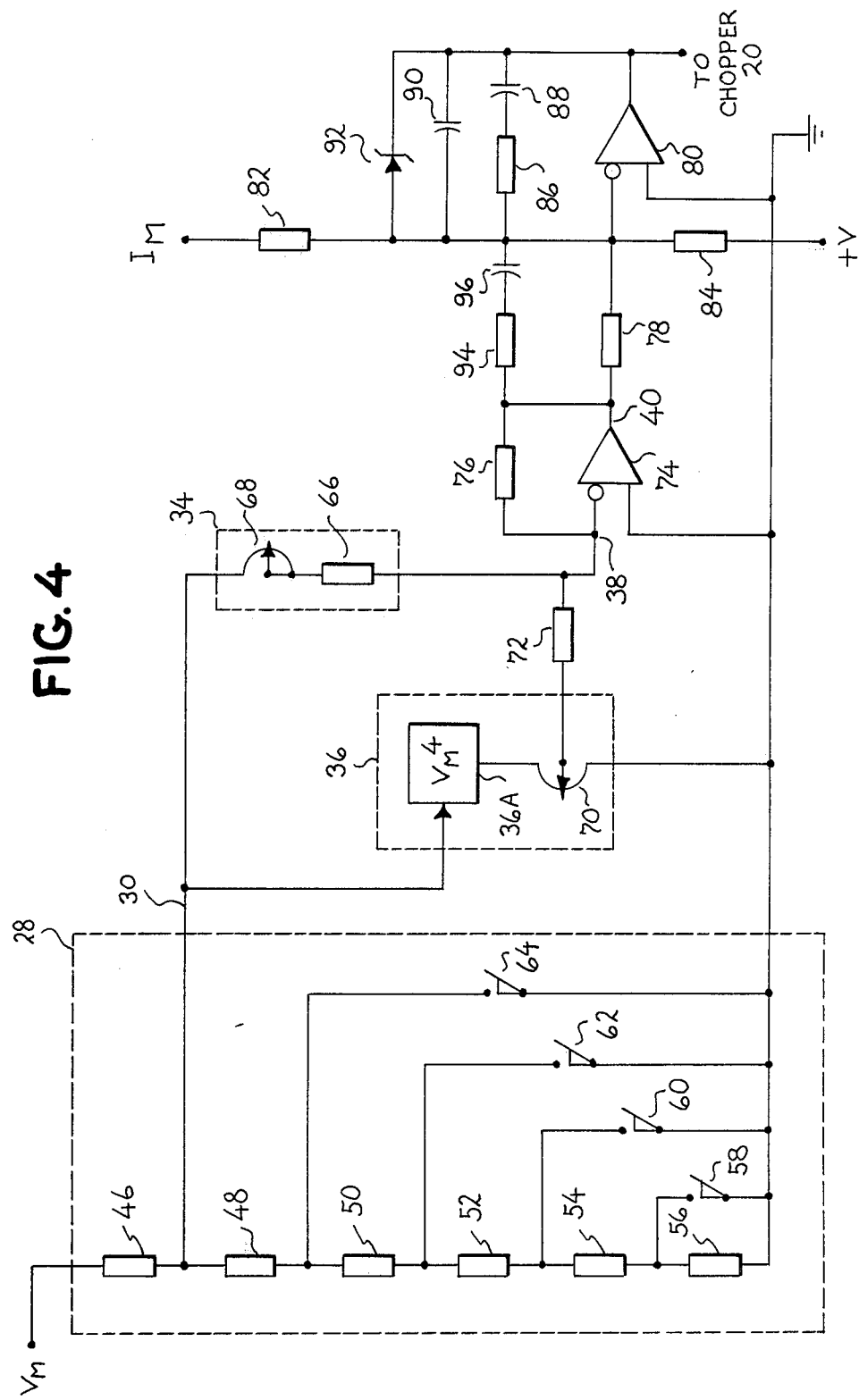

Referring now to FIG. 4, there is shown in more detail a partial schematic and partial block diagram of the function generator and gain compensation network of FIG. 3. As mentioned previously, the potentiometer 28 in a preferred embodiment comprises a resistive voltage divider connected across the combination of motor armature 10 and motor field winding 12. Depending upon the precision with which it is desired to control or regulate motor speed the voltage divider may comprise as many incremental steps as desired or as illustrated in FIG. 3 and may, in fact, comprise a continuously variable voltage divider. For purposes of explanation herein, however, the voltage divider is shown as comprising five stages, in the form of a serial combination of resistors 46, 48, 50, 52, 54 and 56. In order the vary the output signal developed on line 30 which is taken from the junction intermediate the resistors 46 and 48, a plurality of switches 58, 60, 62 and 64 are connected so as to be selectively capable of short circuiting any one of the resistors 50, 52, 54 or 56. The switches 58 through 64 may be of any type all known in the art capable of sustaining the voltage developed across the DC motor and may be controlled by manual or automatic means for setting the desired speed of the motor.

The output signal developed by the voltage divider circuit is coupled by the line 30 to an input terminal of the multiplier circuit 34. As can be seen, the multiplier circuit 34 comprises a series combination resistor 66 and a potentiometer 68, adjustment of the potentiometer 68 serving to set the cost value $K_1$ so that the output signal developed by the circuit 34 is equivalent to $K_1 V_M$ as previously defined.

The line 30 also couples the voltage magnitude signal $V_M$ into the quartic function generator 36. Such function generators are well known in the art and a typical example of such a function generator is illustrated on page A30-3 in FIG. 4 of the *National Semiconductor Linear Applications Manual*, dated Feburary, 1973. The output of the quartic function generator 36 is connected to a potentiometer 70 which is adjustable in order the vary to $K_2$ value in the $K_2V_M^4$ expression. The magnitude of the $K_2V_M^4$ signal is taken from the movable contact arm of the potentiometer 70.

The $K_2V_M^4$ signal is coupled from the potentiometer 70 through resistor 72 to a summing junction 38 at the inverting input terminal of an amplifier 74. The amplifier 74 includes a feedback resistor 76 for setting its gain and is, therefore, connected in the commonly known operational amplifier mode.

The output signal developed by the amplifier 74 represents the current command signal and is conducted by the lead 40 through a resistor 78 to a summing junction 26 at the inverting input terminal of an amplifier 80. The current feedback signal $I_M$ developed from the current shunt 22 is coupled through the resistor 82 to the summing junction 26. Similarly, the aforementioned bias voltage is coupled from a voltage source $+V$ through a resistor 84 to the summing junction 26.

The amplifier 80 in conjunction with a feedback network connected between its output terminal and the summing junction 26 comprises the gain compensation network 44 of FIG. 3. The resistor 86 and capacitor 88 are serially connected between the junction 26 and the output terminal of the amplifier 80. The resistor-capacitor combination perform the integrating function and lead compensation. A capacitor 90 connected in parallel circuit arrangement with the series combination of resistor 86 and capacitor 88 provides some noise filtering at high frequency. This particular capacitor is not considered in the transfer function associated with the block 44 shown in FIG. 3. The zener diode 92 connected in parallel with the capacitor 90 prevents saturating of the amplifier 80 when the input signal to the amplifier 80 is not within its normal control range. A rate feedback circuit comprising a resistor 94 and serially connected capacitor 96 are connected in parallel with the resistor 78 to improve the transient response of the circuit.

The signal developed at the output terminal of the amplifier 80 represents the control signal which is applied to the chopper circuit 20 for adjusting the time ratio of the voltage pulses applied to the DC motor comprising the armature 10 and the winding 12.

While the invention has been described in a preferred embodiment, other modifications and arrangements will be obvious to those having ordinary skill in the art. For example, although the preferred curve fitting resulted in a fourth order polynominal, it has also been found that a third order polynominal, i.e., an expression of $K_1V_M+K_2V_M^3$, also provides relatively accurate speed regulation. Thus, polynomials of $K_1V_M+K_2V_M^N$, where N may take values between 2 and 5, including fractional values such as, for example, 3.1, have been found to produce reasonable approximations of the desired response. Quite clearly, the response of the system may be made more exact by additional polymeric terms. Accordingly, it is intended that the appended claims cover all such modifications as fall within the true spirit and scope of the invention.

What is claimed is:

1. An open-loop speed regulator system for regulating the rotational speed of a rotor of a DC electric motor having series connected armature and field windings including controllable switching means for periodically interconnecting the motor and a DC source, said control system comprising:
    (a) gating control means for controlling the duty factor of the switching means as a function of a current command signal, said gating control means being connected to supply periodic ON and OFF commands to the switching means for controlling said duty factor;
    (b) means for generating a first signal representative of current in the motor;
    (c) means for generating a second signal representative of terminal voltage appearing across the series combination of motor armature and field windings;
    (d) function generator means for receiving said second signal and for generating a third signal having a magnitude which is a predetermined function of the magnitude of said second signal;
    (e) means connected for summing said first signal and said third signal for generating said current command signal; and,
    (f) means for coupling said current command signal to said gating control means.

2. The control system of claim 1 and including means for varying the magnitude of said second signal whereby the speed of the rotor is varied.

3. The control system of claim 2 wherein the relationship between said second signal and said third signal is defined by $$I = K_1V_M + K_2V_M^N,$$

wherein, I represents the magnitude of said third signal, $K_1$ and $K_2$ are constant multipliers determined by the electrical characteristics of the motor, $V_M$ represents the magnitude of said second signal, and N is a number between 2 and 5.

* * * * *